US010390343B2

(12) United States Patent
Narathong et al.

(10) Patent No.: US 10,390,343 B2
(45) Date of Patent: Aug. 20, 2019

(54) CARRIER AGGREGATION DIVERSITY ANTENNA MODULE WITH INTEGRATED LNA BANKS

(71) Applicant: QUALCOMM Incorporated, San Diego, CA (US)

(72) Inventors: Chiewcharn Narathong, Laguna Niguel, CA (US); Aleksandar Miodrag Tasic, San Diego, CA (US); Gurkanwal Singh Sahota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 14/676,639

(22) Filed: Apr. 1, 2015

(65) Prior Publication Data
US 2015/0373711 A1 Dec. 24, 2015

Related U.S. Application Data

(60) Provisional application No. 62/015,951, filed on Jun. 23, 2014.

(51) Int. Cl.
*H04W 72/04* (2009.01)
*H04B 7/024* (2017.01)
(Continued)

(52) U.S. Cl.
CPC ...... *H04W 72/0453* (2013.01); *H04B 1/0057* (2013.01); *H04B 1/44* (2013.01);
(Continued)

(58) Field of Classification Search
CPC .......... H04B 1/44; H04B 1/0057; H04B 1/04; H04B 1/0458; H04B 1/006; H04B 1/0483;
(Continued)

(56) References Cited

U.S. PATENT DOCUMENTS 7,116,952 B2 10/2006 Arafa
7,869,528 B2 1/2011 Robinson
(Continued)

FOREIGN PATENT DOCUMENTS

| CN | 1393064 A | 1/2003 |
|---|---|---|
| CN | 1890898 A | 1/2007 |
| CN | 103780280 A | 5/2014 |

OTHER PUBLICATIONS

International Search Report and Written Opinion—PCT/US2015/035252—ISA/EPO—dated Sep. 16, 2015, 10 pages.

*Primary Examiner* — Ricardo H Castaneyra
(74) *Attorney, Agent, or Firm* — Qualcomm Incorporated-Toler

(57) ABSTRACT

A carrier aggregation diversity antenna module with integrated low noise amplifier banks is disclosed. In an exemplary embodiment, an apparatus includes at least one switch configured to establish a transmit signal path to transmit an uplink signal from at least one diversity antenna and to establish a receive signal path to receive downlink diversity signals from the at least one diversity antenna. The apparatus also includes band selection filters configured to filter the downlink diversity signals to generate at least three diversity band signals. The apparatus also includes a multiplexing amplifier configured to amplify the diversity band signals to generate at least three amplified diversity band signals that are output to a transceiver.

28 Claims, 8 Drawing Sheets

(51) Int. Cl.
*H04J 4/00* (2006.01)
*H04B 1/00* (2006.01)
*H04B 1/44* (2006.01)
*H04L 27/26* (2006.01)
*H04L 1/02* (2006.01)

(52) U.S. Cl.
CPC .............. *H04B 7/024* (2013.01); *H04J 4/005* (2013.01); *H04L 1/02* (2013.01); *H04L 27/2601* (2013.01)

(58) Field of Classification Search
CPC . H04B 7/024; H04B 7/02; H04B 7/12; H04B 7/068; H04B 2001/0408; H04B 10/2935; H04W 88/06; H04W 40/06; H04W 72/0453; H04L 1/02; H04L 27/2601; H04L 25/0292; H04L 25/03343; H04J 4/005; H03F 2200/451; H03F 3/211; H03F 3/189
See application file for complete search history.

(56) References Cited

U.S. PATENT DOCUMENTS

| | | | |
|---|---|---|---|
| 8,045,592 B2 | 10/2011 | Combi et al. | |
| 8,086,197 B2 | 12/2011 | Doris et al. | |
| 8,774,068 B2 | 7/2014 | Bengtsson et al. | |
| 9,473,336 B2 | 10/2016 | Pan et al. | |
| 2006/0099925 A1 | 5/2006 | Tsai et al. | |
| 2007/0001768 A1 | 1/2007 | Kim et al. | |
| 2009/0108911 A1 | 4/2009 | Nakahara et al. | |
| 2009/0176467 A1 | 7/2009 | Im et al. | |
| 2011/0110452 A1* | 5/2011 | Fukamachi | H01P 1/20336 375/267 |
| 2012/0182430 A1 | 7/2012 | Birkett et al. | |
| 2012/0195237 A1 | 8/2012 | Chan et al. | |
| 2012/0236830 A1 | 9/2012 | Takano et al. | |
| 2012/0327825 A1 | 12/2012 | Gudem et al. | |
| 2013/0043946 A1* | 2/2013 | Hadjichristos | H04B 1/0057 330/252 |
| 2013/0336181 A1* | 12/2013 | Khlat | H04L 5/06 370/297 |
| 2014/0003300 A1 | 1/2014 | Weissman et al. | |
| 2014/0036777 A1 | 2/2014 | Kokkinos et al. | |
| 2014/0072001 A1 | 3/2014 | Chang et al. | |
| 2014/0113578 A1 | 4/2014 | Xu et al. | |
| 2015/0244404 A1 | 8/2015 | Liu et al. | |
| 2015/0280654 A1* | 10/2015 | Kehrer | H03F 1/26 455/293 |
| 2015/0304000 A1* | 10/2015 | Wloczysiak | H04B 1/006 455/78 |
| 2015/0333949 A1 | 11/2015 | Tasic et al. | |
| 2016/0191092 A1 | 6/2016 | Liao et al. | |
| 2018/0013600 A1 | 1/2018 | Tasic et al. | |

* cited by examiner

CARRIER AGGREGATION DIVERSITY ANTENNA MODULE WITH INTEGRATED LNA BANKS

CLAIM OF PRIORITY UNDER 35 U.S.C. § 119

The present application for patent claims priority to U.S. Provisional Application having Application No. 62/015,951, entitled "CARRIER AGGREGATION DIVERSITY ANTENNA MODULE WITH INTEGRATED LNA BANKS" filed Jun. 23, 2014, assigned to the assignee hereof and expressly incorporated herein by reference.

BACKGROUND

I. Field

The present disclosure relates generally to transceivers, and more specifically to a diversity antenna module for use in carrier aggregation transceivers.

II. Background

In a radio frequency (RF) transceiver, a communication signal is developed, upconverted, amplified and transmitted by a transmitter and is received, amplified, downconverted and recovered by a receiver. In the receiver, the communication signal is typically received and downconverted by receive circuitry to recover the information contained in the communication signal. A single transmitter or receiver can be configured to operate using multiple transmit frequencies and/or multiple receive frequencies. For a receiver to be able to simultaneously receive two or more receive signals, the concurrent operation of two or more receive paths is used. Such systems are sometimes referred to as "carrier-aggregation" (CA) systems. The term "carrier-aggregation" may refer to systems that include inter-band carrier aggregation (Inter-CA) and intra-band carrier aggregation (Intra-CA). Inter-CA refers to the processing of two or more separate (either contiguous or non-contiguous) carrier signals that occur in different communication bands. Intra-CA refers to the processing of two or more separate (either contiguous or non-contiguous) carrier signals that occur in the same communication band. The carrier aggregated RF signal is typically down-converted using one or more distinct local oscillator (LO) frequencies, which generally employ one or more low noise amplifiers (LNA) to process the multiple carriers present in the RF signal. The amplified signal is typically processed by downconversion and demodulation circuitry to extract the information contained in the received signal.

In a conventional multi-antenna transceiver design, there is typically a primary antenna and several secondary antennas. The secondary antennas constitute an array of diversity antennas. Baseband electronics (e.g., modem, signal conditioners, etc.) produce signals for transmission and also operate to process received signals. The baseband electronics interface with a transceiver that connects to RF front end electronics. The RF front end electronics includes amplifiers, duplexer, or other filters to amplify and route signals to and from the antennas. The signals may be in various communication bands, such as low band (LB), mid band (MB), and/or high band (HB) signals.

The RF front end electronics typically includes a receiver module for routing diversity signals received from the secondary antennas to the transceiver. Unfortunately, conventional receiver modules may be complex with many switches and filters thereby requiring large circuit area. Furthermore, conventional receiver modules may have limitations as to how many diversity signals can be simultaneously received and/or how various receive and transmit modes are performed in combination.

It is therefore desirable to have a diversity receiver module that reduces or eliminates the number switches and filters that are utilized to reduce costs and space requirements, and that provides a wide range of transmit and receive combinations when compared to conventional designs.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Figure 1:
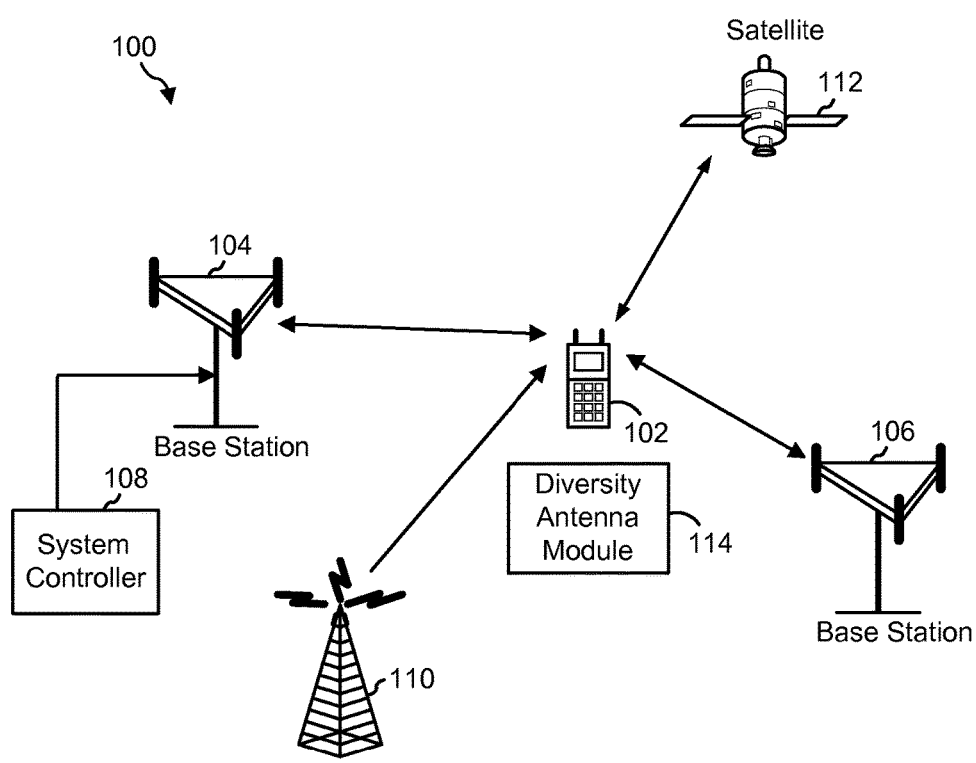
FIG. 1 shows an exemplary embodiment of a diversity antenna module that efficiently routes received RF signals from multiple antennas to a receiver in a wireless device communicating within a wireless system.

FIG. 1 shows an exemplary embodiment of a diversity antenna module 114 that efficiently routes received RF signals from multiple antennas to a receiver in a wireless device 102 communicating within a wireless system 100. Wireless system 100 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. For simplicity, FIG. 1 shows wireless system 100 including two base stations 104 and 106 and one system controller 108. In general, wireless system 100 may include any number of base stations and any set of network entities.

Wireless device 102 may also be referred to as a user equipment (UE), a mobile station, a terminal, an access terminal, a subscriber unit, or a station. Wireless device 102 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, or other communicating device. Wireless device 102 may communicate with devices in the wireless system 100. Wireless device 102 may also receive signals from broadcast stations (e.g., a broadcast station 110), or signals from satellites (e.g., a satellite 112) in one or more global navigation satellite systems (GNSS). Wireless device 102 may support one or more radio technologies for wireless communication such as LTE, WCDMA, CDMA 1x, EVDO, TD-SCDMA, GSM, 802.11. In various exemplary embodiments, the diversity antenna module 114 efficiently routes received RF signals from multiple antennas to a receiver in the device 102. In an exemplary embodiment, the diversity antenna module 114 operates with a reduced the number of switches and filters typically used in conventional systems to reduce circuit area and increase the functionality, thereby allowing more combinations of primary and diversity signals to be simultaneously transmitted and received.

Figure 2:
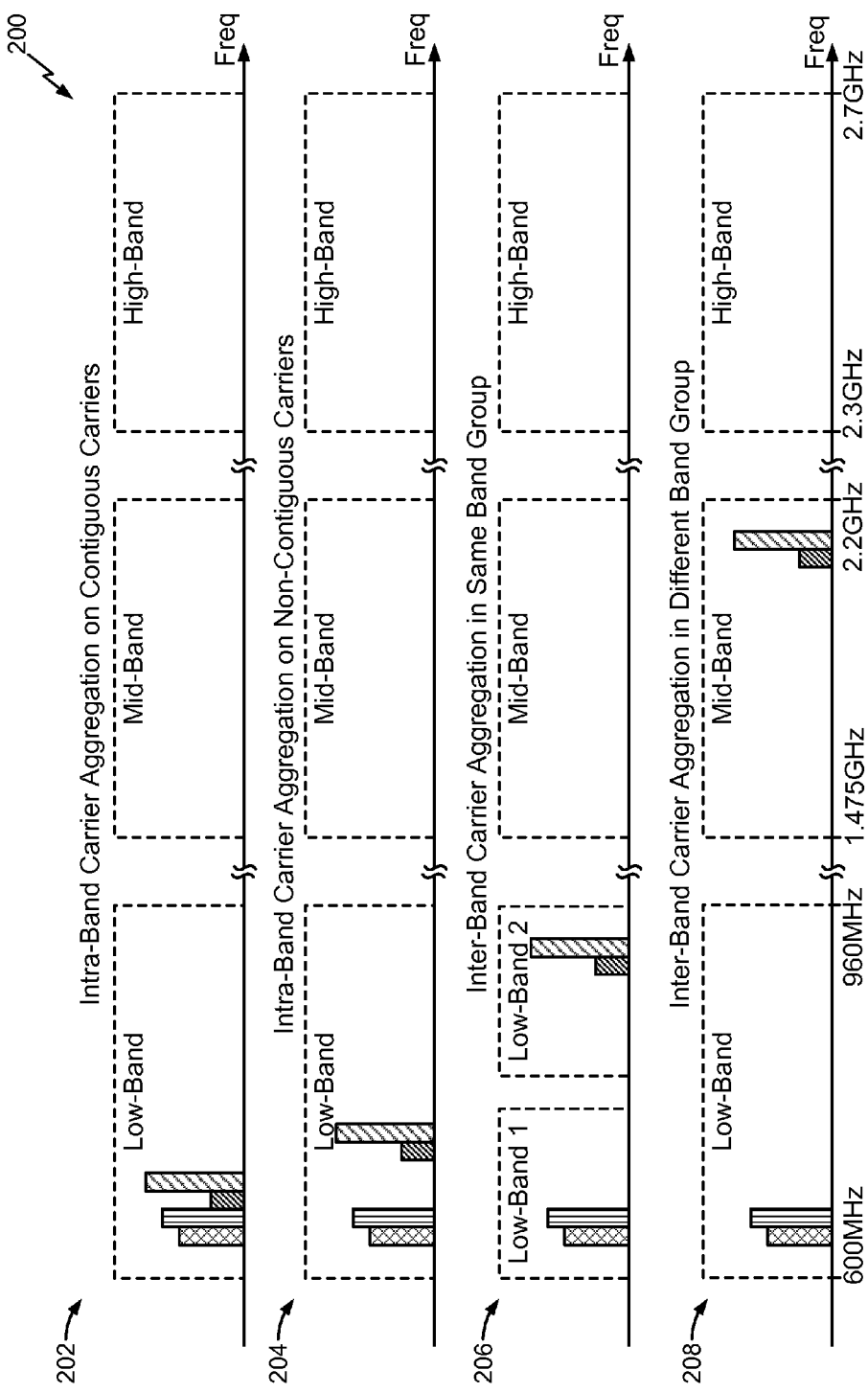
FIG. 2 shows diagrams that illustrate signal carrier configurations in a carrier aggregation communication system.

FIG. 2 shows diagrams 200 that illustrate signal carriers in a carrier aggregation communication system. For example, the signal configurations show carriers that may be transmitted or received in the communication system 100 shown in FIG. 1. For example, the diagrams 200 show low-band, mid-band and high-band groups and each band group may have one or more carrier signals. In diagram 206, the low-band group is divided into two bands.

Diagram 202 shows an illustration of contiguous intra-band carriers. For example, there are multiple contiguous carriers in one band (e.g., four contiguous carriers in the low-band). Wireless device 100 may send and/or receive transmissions on the four contiguous carriers within the same band.

Diagram 204, shows an illustration of non-contiguous intra-band carriers. For example, there are multiple non-contiguous carriers in one band (e.g., four non-contiguous carriers in the low-band). The carriers may be separated by 5 MHZ, 10 MHz, or some other amount. Wireless device 100 may send and/or receive transmissions on the four non-contiguous carriers within the same band.

Diagram 206 shows an illustration of inter-band carriers in the same band group. For example, there are multiple carriers in two bands (e.g., two contiguous carriers in low band 1 and two contiguous carriers in low-band 2). Wireless device 100 may send and/or receive transmissions on the four carriers in different bands in the same band group, Diagram 208 shows an illustration of inter-band carriers in different band groups. For example, there are multiple carriers in two bands of different band groups (e.g., two carriers in the low-band group and two carriers in the mid-band group. Wireless device 100 may send and/or receive transmissions on the four carriers in the different band groups. It should also be noted that other carrier configurations in a carrier aggregation system having other combinations of bands and band groups may also be supported.

Figure 3:
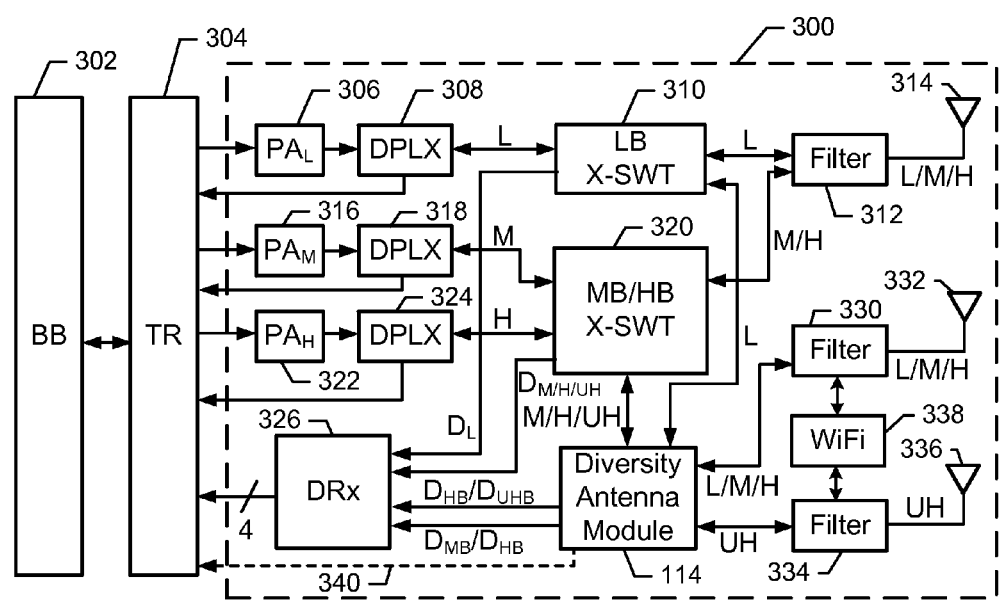
FIG. 3 shows a block diagram of a receiver front end that includes an exemplary embodiment of a diversity antenna module.

FIG. 3 shows a block diagram of a receiver front end 300 that includes an exemplary embodiment of a diversity antenna module 114. For example, the receiver front end 300 is suitable for use to transmit and receive RF signals at the device 102 shown in FIG. 1. In an exemplary embodiment, a baseband (BB) processor 302 processes baseband signals that are communicated to and from a transceiver 304. Baseband signals to be transmitted from the device 102 are up-converted to RF signals by the transceiver 304 and output to the front end 300 for transmission by one or more antennas. For example, the RF signals may comprise carrier signals that are in any of the band groups illustrated in FIG. 2. However, the RF signals for transmission are not limited to any specific band group configuration. RF signals received by the front end 300 are passed to the transceiver 304 where they are down-converted to baseband and then passed to the baseband processor 302 for further processing.

The front end 300 transmits and receives RF signals using an antenna group comprising a primary antenna 314 and secondary (or diversity) antennas 332 and 336. Filter 312 is coupled to a low band cross switch 310 and a mid/high band cross switch 320 and filters signals communicated between the primary antenna 314 and the cross switches 310 and 320. In an exemplary embodiment, the filter 312 is set so that the primary antenna 314 can transmit and receive signals in low, mid, and high bands. For example, in an exemplary embodiment, the low, mid, and high bands are those shown in FIG. 2.

Filter 330 is coupled to the diversity antenna module 114 and filters signals communicated between the secondary antenna 332 and the diversity antenna module 114. In an exemplary embodiment, the filter 330 is set so that the secondary antenna 332 can transmit and receive signals in the low, mid, and high bands. Filter 334 is coupled to the diversity antenna module 114 and filters signals communicated between the secondary antenna 336 and the diversity antenna module 114. In an exemplary embodiment, the filter 334 is set so that the secondary antenna 336 can transmit and receive signals in an ultra high band. A WiFi modem 338 communicates using either of the secondary antennas 332 and 336. In an exemplary embodiment, the modem 338 communicates signals to and from the filter 330 so that the secondary antenna 332 can transmit and receive signals in a 2.4 GHz WiFi band. In an exemplary embodiment, the modem 338 communicates signals to and from the filter 334 so that the secondary antenna 336 can transmit and receive signals in a 5 GHz WiFi band.

RF signals to be transmitted in the low band are amplified by power amplifier ($PA_L$) 306 and passed to duplexer 308. The duplexer 308 passes the signals to be transmitted to the low band cross switch 310 that routes the signals to the primary antenna 314 or through the diversity antenna module 114 to the secondary antenna 332 for transmission. Low band signals received from the primary antenna 314 or the secondary antenna 332 flow through either of the same paths in the reverse direction to the cross switch 310 and then are input to the duplexer 308 and passed back to transceiver 304 for processing.

RF signals to be transmitted in the mid band are amplified by $PA_M$ 316 and passed to duplexer 318. The duplexer 318 passes the signals to the mid/high band cross switch 320 that routes the signals to the primary antenna 314 or the diversity antenna module 114. The diversity antenna module 114 routes the mid band signals to the antenna 332 for transmission. Mid band signals received from the primary antenna 314 or the secondary antenna 332 flow back through the diversity antenna module 114 in the reverse direction to the cross switch 320 and then are input to the duplexer 318 where they are filtered and passed back to transceiver 304 for processing.

RF signals to be transmitted in the high band are amplified by $PA_H$ 322 and passed to duplexer 324. The duplexer 324 passes the signals to the mid/high band cross switch 320 that routes the signals to the primary antenna 314 or the diversity antenna modules 114. The diversity antenna module 114 routes the high band signals to the antenna 332 for transmission. High band signals received from the primary antenna 314 or the secondary antenna 332 flow back through the diversity antenna module 114 in the reverse direction to the cross switch 320 and then are input to the duplexer 324 and passed back to transceiver 304 for processing.

The front end 300 comprises a diversity receiver (DRx) 326 that receives a low band diversity signal ($D_L$) from the cross switch 310 and selectively filters this signal to input selected low band diversity signals to the transceiver 304. The diversity receiver (DRx) 326 also receives mid, high, and ultra high (M/H/UH) band diversity signals ($D_M/D_H/D_{UH}$) from the cross switch 320 and selectively filters these signals to input selected mid, high, and ultra high band diversity signals to the transceiver 304.

In an exemplary embodiment, the diversity antenna module 114 receives and selectively filters mid and high band signals from the antenna 332 to generate mid and high band diversity signals ($D_{MB}/D_{HB}$) that are output from the module 114 and input to the DRx 326. In an exemplary embodiment, the diversity antenna module 114 receives and selectively filters high band signals from the antenna 332 and ultra high band signals from the antenna 336 to generate high and ultra high band diversity signals ($D_{HB}/D_{UHB}$) that are output from the module 114 and input to the DRx 326. In an exemplary embodiment, the diversity antenna module 114 outputs all or selected diversity signals directly to the transceiver 304 using optional signal path 340 thereby bypassing the DRx 326.

The DRx module 326 operates to filter and selectively switch the low, mid, high and ultra high band diversity signals received from the cross switches 310 and 320 to input selected low, mid, high and high band diversity signals to the transceiver 304. The DRx module 326 also operates to selectively switch the mid ($D_{MB}$), high ($D_{HB}$) and ultra high ($D_{UHB}$) signals received from the diversity antenna module 114 to input one or more of these signals directly into the transceiver 304 without additional filtering.

The diversity antenna module 114 is configured to efficiently filter and route diversity signals to the transceiver 304 through the DRx 326 with fewer components (e.g., fewer switches and filters) and with greater flexibility (e.g., more diversity signal combinations) than conventional circuits. For example, in an exemplary embodiment, the DRx module 326 can simultaneously input up to four diversity signals into the transceiver 304.

Low Band Communications Using Primary Antenna

The front end 300 provides low band communication to transmit and receive signals in the low band. In an exemplary embodiment, the front end 300 includes the low band power amplifier ($PA_L$) 306 that receives low band RF signals from the transceiver 304. The $PA_L$ 306 outputs amplified signals to a duplexer 308 that filters the signals and passes amplified signals in the low band to the low band cross switch 310. The low band cross switch 310 outputs signals to the filter 312, which provides filtering after which the low band signals are transmitted by the primary antenna 314. Low band signals received by the primary antenna 314 are filtered by filter 312 and input to the low band cross switch 310. The low band signals output from the low band cross switch 310 are input back to the duplexer 308 where they are filtered and passed back to the transceiver 304.

Low Band Communications Using Secondary Antenna

The low band cross switch 310 also communicates with the diversity antenna module 114 to transmit and receive signals in the low band using the secondary antenna 332. For example, low band signals output from the low band cross switch 310 are input to the diversity antenna module 114 which passes the low band signals to the filter 330. The signals are filtered and then transmitted using the secondary antenna 332. Low band signals received by the secondary antenna 332 are filtered by the filter 330 and input to the diversity antenna module 114. The diversity antenna module 114 outputs low band signals to the cross switch 310. From the cross switch 310 the low band signals received by the secondary antenna 332 are input to the duplexer 308 and flow back to the transceiver 304.

Diversity Reception of Low Band Signals

The front end 300 performs diversity reception of low band signals using the cross switch 310. For example, both the primary antenna 314 and the secondary antenna 332 receive low band signals that are routed to the low band cross switch 310. The low band cross switch 310 selects one of its low band inputs to output as the low band diversity signal ($D_L$) that is input to the DRx 326. The DRx 326 filters and selects bands of the low band diversity signal to be input to the transceiver 304.

Mid Band Communications Using Primary Antenna

The front end 300 provides mid band communication to transmit and receive signals in the mid band. In an exemplary embodiment, the front end 300 includes the mid band power amplifier $PA_M$ 316 that receives mid band RF signals from the transceiver 304. The $PA_M$ 316 outputs amplified signals to a duplexer 318 that filters the signals and passes amplified signals in the mid band to a mid/high band cross switch 320. The cross switch 320 outputs signals in the mid band signals to the filter 312, which provides mid band filtering after which the mid band signals are transmitted by the primary antenna 314. Mid band signals received by the primary antenna 314 are filtered by filter 312 and input to the cross switch 320. The mid band signals output from the cross switch 320 are input back to the duplexer 318 where they are filtered and passed back to the transceiver 304.

Mid Band Communications Using Secondary Antenna

The mid band cross switch 320 also communicates with the diversity antenna module 114 to transmit and receive signals in the mid band using the secondary antenna 332. For example, mid band signals output from the mid band cross switch 320 are passed to the diversity antenna module 114, passed to the filter 330 and transmitted using the secondary antenna 332. Mid band signals received by the secondary antenna 332 are filtered by the filter 330, input to the diversity antenna module 114 and then passed to the mid band cross switch 320. From the cross switch 320 the mid band signals received by the secondary antenna 332 are input to the duplexer 318 and flow back to the transceiver 304.

Diversity Reception of Mid Band Signals

The front end 300 provides for diversity reception of mid band signals using the primary antenna 314 or the secondary antenna 332. For example, diversity mid band signals received by the primary antenna 314 are filtered by filter 312 and input to the cross switch 320. The diversity mid band signals ($D_M$) output from the cross switch 320 are input to the DRx 326 where they are filtered and switched to generate selected diversity mid band signals that are input to the transceiver 304.

In another embodiment, the secondary antenna 332 receives diversity mid band signals that are routed to the diversity antenna module 114. The diversity antenna module 114 filters and selects one or more of the mid bands to generate the mid band diversity signals ($D_{MB}$) that are input to the DRx 326, which selectively inputs these signals to the transceiver 304 without additional filtering.

High Band Communications Using Primary Antenna

The front end 300 provides high band communication to transmit and receive signals in the high band. In an exemplary embodiment, the front end 300 includes the high band power amplifier ($PA_H$) 322 that receives high band RF signals from the transceiver 304. The $PA_H$ 322 outputs amplified signals to a duplexer 324 that filters the signals and passes amplified signals in the high band to the cross switch 320. The cross switch 320 outputs signals in the high band signals to the filter 312, which provides filtering after which the high band signals are transmitted by the primary antenna 314. High band signals received by the primary antenna 314 are filtered by filter 312 and input to the cross switch 320. The high band signals output from the cross switch 320 are input back to the duplexer 324 where they are filtered and passed back to the transceiver 304.

High Band Communications Using Secondary Antenna

The cross switch 320 also communicates with the diversity antenna module 114 to transmit and receive signals in the high band using the secondary antenna 332. For example, high band signals output from the cross switch 320 are passed to the diversity antenna module 114, passed to the filter 330 and transmitted using the secondary antenna 332. High band signals received by the secondary antenna 332 are filtered by the filter 330, input to the diversity antenna module 114 and then passed to the cross switch 320. From the cross switch 320 the high band signals are input to the duplexer 324 and flow back to the transceiver 304.

Diversity Reception of High Band Signals

The front end 300 provides for diversity reception of high band signals using the primary antenna 314 and the secondary antenna 332. For example, high band signals received by the primary antenna 314 are filtered by filter 312 and input to the cross switch 320. The high band signals output from the cross switch 320 are input to the DRx 326 as high band diversity signals ($D_H$), where they are filtered and switched before being passed to the transceiver 304.

In another embodiment, the secondary antenna 332 receives high band signals that are routed to the diversity antenna module 114. The diversity antenna module 114 selects one or more bands of the high band diversity signals and outputs the selected high band diversity signals ($D_{HB}$) to the DRx 326. The DRx 326 selectively outputs the high band diversity signals to the transceiver 304 without additional filtering.

Diversity Reception of Ultra High Band Signals

The front end 300 provides for transmission and reception of ultra high band signals using the diversity antenna module 114 that works in conjunction with the secondary antenna 336. For example, the secondary antenna 336 receives ultra high band signals that are routed to the diversity antenna module 114. The diversity antenna module 114 selects one or more bands of the ultra high band diversity signals and outputs selected high band diversity signals ($D_{UHB}$) to the DRx 326. The DRx 326 outputs the ultra high band diversity signals to the transceiver 304 without additional filtering.

The following table provides band assignments, uplink frequencies, downlink frequencies and band groups for FDD LTE communication bands.

| band | uplink (MHz) | downlink (MHz) | band group |
|---|---|---|---|
| 5 | 824-849 | 869-894 | LOW |
| 6 | 830-840 | 875-885 | LOW |
| 8 | 880-915 | 925-960 | LOW |
| 12 | 698-716 | 728-746 | LOW |
| 13 | 777-787 | 746-756 | LOW |
| 14 | 788-798 | 758-768 | LOW |
| 17 | 704-716 | 734-746 | LOW |
| 18 | 815-830 | 860-875 | LOW |
| 19 | 830-845 | 875-890 | LOW |
| 20 | 832-862 | 791-821 | LOW |
| 26 | 814-849 | 859-894 | LOW |
| 27 | 807-824 | 852-869 | LOW |
| 28 | 703-748 | 758-803 | LOW |
| 29 | n/a | 717-728 | LOW |
| 31 | 452.5-457.5 | 462.5-467.5 | LOW |
| 1 | 1920-1980 | 2110-2170 | MID |
| 2 | 1850-1910 | 1930-1990 | MID |
| 3 | 1710-1785 | 1805-1880 | MID |
| 4 | 1710-1755 | 2110-2155 | MID |
| 9 | 1749.9-1784.9 | 1844.9-1879.9 | MID |
| 10 | 1710-1770 | 2110-2170 | MID |
| 11 | 1427.9-1452.9 | 1475.9-1500.9 | MID |
| 15 | 1900-1920 | 2600-2620 | MID |
| 21 | 1447.9-1462.9 | 1495.5-1510.9 | MID |
| 23 | 2000-2020 | 2180-2200 | MID |
| 24 | 1625.5-1660.5 | 1525-1559 | MID |
| 25 | 1850-1915 | 1930-1995 | MID |
| 7 | 2500-2570 | 2620-2690 | HIGH |
| 16 | 2010-2025 | 2585-2600 | MID/HIGH |
| 30 | 2305-2315 | 2350-2360 | HIGH |
| 22 | 3410-3500 | 3510-3600 | ULTRA HIGH |

The following table provides band assignments, frequency allocations, band widths, and band groups for TDD LTE communication bands.

| band | allocation (MHz) | width (MHz) | band group |
|---|---|---|---|
| 44 | 703-803 | 100 | LOW |
| 33 | 1900-1920 | 20 | MID |
| 34 | 2010-2025 | 15 | MID |
| 35 | 1850-1910 | 60 | MID |
| 36 | 1930-1990 | 60 | MID |
| 37 | 1910-1930 | 20 | MID |
| 39 | 1880-1920 | 40 | MID |
| 38 | 2570-2620 | 50 | HIGH |
| 40 | 2300-2400 | 100 | HIGH |
| 41 | 2496-2690 | 194 | HIGH |
| 42 | 3400-3600 | 200 | ULTRA HIGH |
| 43 | 3600-3800 | 200 | ULTRA HIGH |

Figure 4:
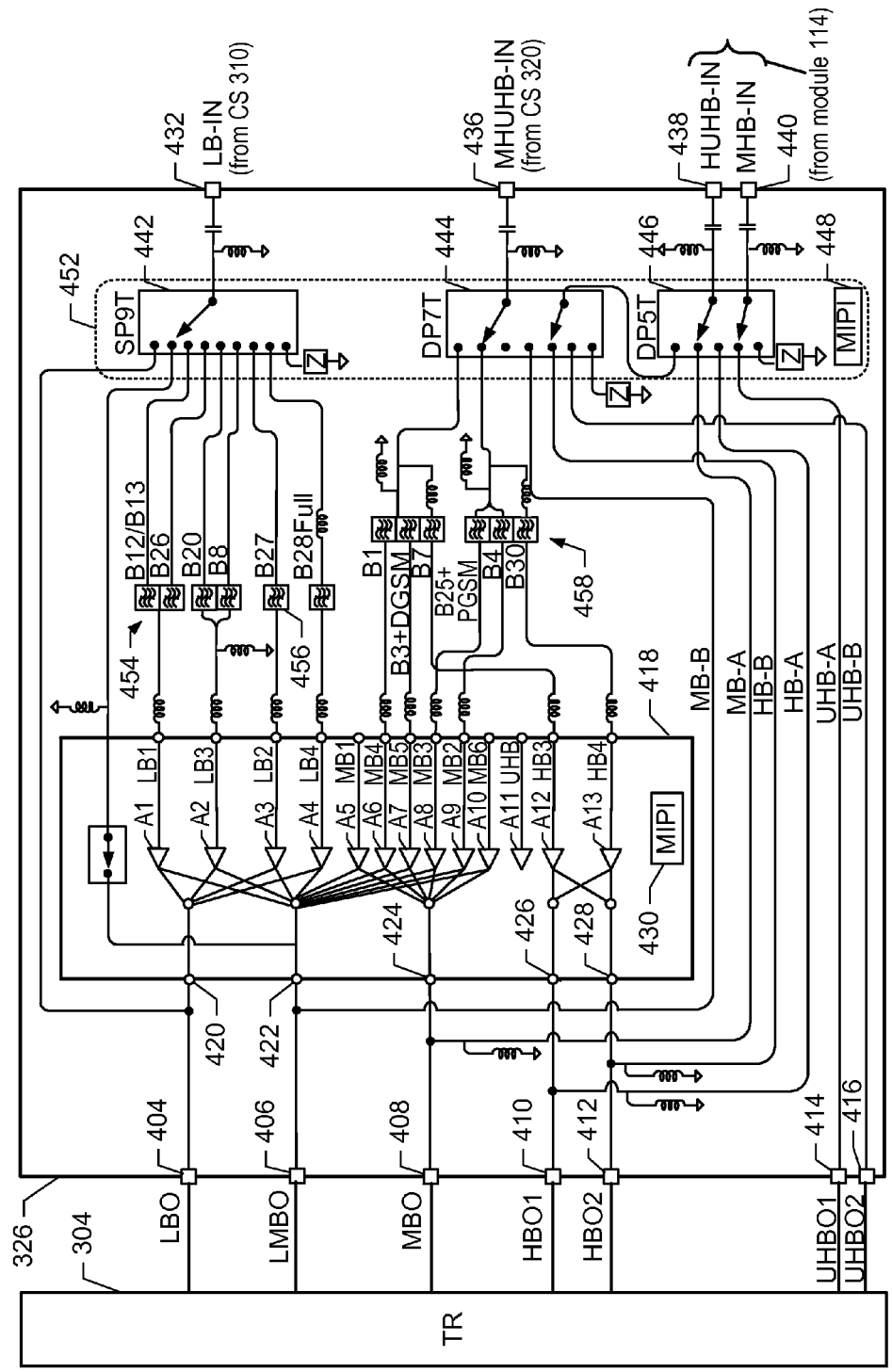
FIG. 4 shows a detailed exemplary embodiment of the diversity receiver shown in FIG. 3.

FIG. 4 shows a detailed exemplary embodiment of the DRx 326 shown in FIG. 3. The DRx 326 communicates diversity signals to the transceiver 304. For example, the diversity signals comprise a low band output (LBO) signal at input terminal 404, low/mid band output (LMBO) signal at input terminal 406, mid band output (MBO) signal at input terminal 408, first high band output (HBO 1) signal at input terminal 410, second high band output (HBO2) at input terminal 412, first ultra high band output (UHBO1) at input terminal 414, and second ultra high band output (UHBO2) signal at input terminal 416, which are communicated between the DRx 326 and the transceiver 304.

In an exemplary embodiment, the DRx 326 receives low band input 432, mid/high/ultra high band input 436, high/ultra high band input 438 and mid/high band input 440 as shown. In an exemplary embodiment, the received signals flow to a switch group 452 that includes switch 442, switch 444 and switch 446. The switch group 452 switches the received signals to selected switch outputs, which either pass the switched signals to band pass filters or pass the switched signals directly to the DRx 326.

The switch 442 comprises a single pole nine throw switch that includes a single input that receives the low band input signal 432 and selectively connects this signal to one of nine output terminals. A first output terminal of the switch 442 is directly connected to the LBO at terminal 404. A second output terminal of the switch 442 is connected to a separate switch of a multiplexing LNA 418 and the output of that switch is connected to the LMBO at terminal 406.

The third through eighth output terminals of the switch 452 are connected to signal paths that include filters, shown generally at 454. The filters operate to filter the low band input signal 432 to pass selected low bands to the multiplexing LNA 418. For example, the filter 456 filters the low band input signal 432 to pass band 27 "B27" to the multiplexing LNA 418. Thus, the filters 454 filter the low band input signal at terminal 432 to pass bands B12/B13, B26, B20, B8, B27, and B28 to the multiplexing LNA 418. The ninth output terminal of the switch 442 is connected to the signal ground through impedance "Z."

The switch 444 comprises a double pole seven throw switch that includes a first input terminal that receives the mid/high/ultra high band input signal 436 and a second input terminal that is connected to an output terminal of the switch 446. The first and second input terminals of the switch 444 can be connected to any of the output terminals but not the same output terminal.

The first two output terminals of the switch 444 are connected to filters shown generally at 458. The filters 458 operate to filter the signals output from the first two output terminals of the switch 444 to pass selected mid and high bands to the multiplexing LNA 418. Thus, the filters 458 filter the signals output from the first two output terminals of the switch 444 to pass mid bands B1, B3+DGSM, B25+ PGSM, and B4 and high bands B7 and B30 to the multiplexing LNA 418.

The switch 444 includes a third output terminal that is unused and a seventh output terminal that is connected to a signal ground through impedance "Z." The third, fourth, and fifth output terminals of the switch 444 are connected directly to the output terminals of the DRx 326. For example, the fourth output terminal is directly connected to the LMBO terminal 406 to pass a mid band (MB-B) signal directly to the transceiver 304. The fifth output terminal is directly connected to the HBO2 terminal 412 to pass a high band (HB-B) signal directly to the transceiver 304. The sixth output terminal is directly connected to the UHBO2 terminal 416 to pass an ultra high band signal (UHB-B) directly to the transceiver 304.

The switch 446 comprises a double pole five throw switch that includes two input terminals that receive high/ultra high band input signal 438 and the mid/high band input signal 440. The switch 446 selectively connects the input signals 438 and 440 at its input terminals to any of five output terminals to pass selected signals directly to selected output terminals of the DRx 326. For example, a first output terminal of the switch 446 is connected to the second input terminal of the switch 444. Thus, the switch 444 can receive the HUHB signal at terminal 438 or the MHB signal at terminal 440 as an input to the switch 444. The second output terminal of the switch 446 is directly connected to the MBO terminal 408 to pass a mid band (MB-A) signal directly to the transceiver 304. The third output terminal of the switch 446 is directly connected to the HBO2 terminal 412 to pass a high band (HB-A) signal directly to the transceiver 304. The fourth output terminal of the switch 446 is directly connected to the UHBO1 terminal 414 to pass an ultra high band (UHB-A) signal directly to the transceiver 304. The sixth output terminal of the switch 446 is connected to the signal ground through impedance "Z."

In an exemplary embodiment, a mobile industry processor interface (MIPI) 448 operates to control the operation of the switches 442, 444 and 446 of the switch group 452. For example, the MIPI 448 controls the operation of the switches 442, 444 and 446 to connect their input terminals to selected output terminals based on received command and control information from another entity at the device, such as the baseband processor 302.

The multiplexing LNA 418 includes amplifiers (A1-A13). Selected amplifiers of the multiplexing LNA 418 have their outputs connected together to generate a combined signal. For example, the outputs of a first group of amplifiers (A1-A4) have their outputs connected together to provide a signal comprising a selected low band at node 420, which is connected to the LBO terminal 404. A second group of amplifiers (A1-A10) have their outputs connected together to provide a signal comprising a selected low or mid band at node 422, which is connected to the LMBO terminal 406. A third group of amplifiers (A5-A10) have their outputs connected together to provide a signal comprising a selected mid band at node 424, which is connected to the MBO terminal 408. A fourth group of amplifiers (A12-A13) have their outputs connected together to provide a signal comprising a selected high band at node 426, which is connected to the HBO1 terminal 410. A fifth group of amplifiers (A12-A13) have their outputs connected together to provide a signal comprising a selected high band at node 428, which is connected to the HBO2 terminal 412.

Enabling and disabling the amplifiers (A1-A13) controls which of the input signal bands are amplified and passed to the output nodes. In an exemplary embodiment, MIPI 430 operates to enable and disable the amplifiers (A1-A13) to control the operation of the multiplexing LNA 418 to amplify and pass selected signal bands to the output terminals 404, 406, 408, 410, and 412. Accordingly, the DRx 326 receives diversity signals obtained from one or more of the primary and secondary antennas, filters selected signals to pass selected bands, amplifies the selected bands and inputs the amplified bands to the transceiver 304. In an exemplary embodiment, selected diversity signals received by the DRx 326 are input directly to the transceiver 304 after flowing through one or more of the switches in the switch group 452. For example, the signals MB-A, MB-B, HB-A, HB-B, UHB-A, and UHB-B flow from the switches 444 and 446 directly to the transceiver 304 without additional filtering or amplification.

Figure 5:
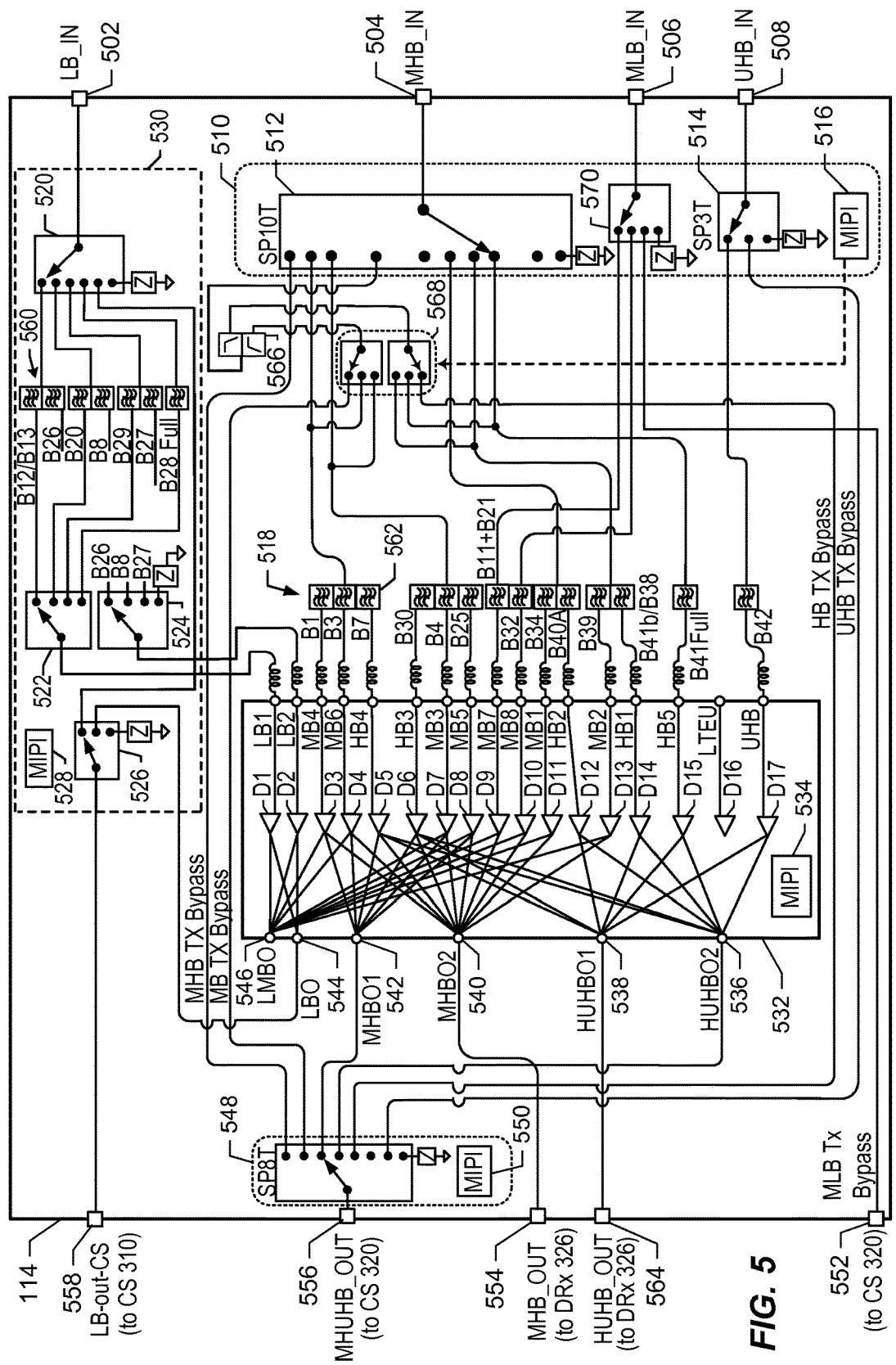
FIG. 5 shows a detailed exemplary embodiment of the diversity antenna module shown in FIG. 3.

FIG. 5 shows a detailed exemplary embodiment of the diversity antenna module 114 shown in FIG. 3. In an exemplary embodiment, the diversity antenna module 114 receives signals from the secondary antennas and outputs selected received signals for input to the transceiver 304 as diversity signals. For example, the module 114 receives a low band input from antenna 332 at terminal 502, mid/high band input from antenna 332 at terminal 504, mid/low band input from antenna 332 at terminal 506, and ultra high band input from antenna 336 at terminal 508.

The low band input signal at terminal 502 is input to an input terminal of switch 520 of low band module 530. The switch 520 connects its input terminal to one of six output terminals to pass the low band signal to associated signal paths. A filter bank 560 filters the outputs of the switch 520 to pass selected low band signals to switches 522 and 524. For example, in an exemplary embodiment, the filter bank 560 filters the low band input signal to pass signal bands B12/B13, B26, B20, B8, B29, B27, and B28Full to the switches 522 and 524.

The outputs of the filters flow to corresponding input terminals of switches 522 and 524. The switch 522 connects one of its input terminals to an output terminal to pass a selected band of the low band signal as a first low band input (LB1) to a multiplexing LNA 532. The switch 524 also receives various bands of the low band signal at its input terminals and connects one of its input terminals to one output terminal to pass a selected low band signal to the multiplexing LNA 532 as a second low band input (LB2).

A switch 526 has an input terminal that is connected to the terminal 558 to send and receive low band signals with the cross switch 310. For example, when receiving a low band transmit signal from the cross switch 310, the switch 526 connects its input terminal to a first output terminal to pass the low band transmit signal to the fifth terminal of the switch 520. The switch 520 is controlled to connect the fifth terminal to its input terminal to pass the low band transmit signal to the terminal 502 and thus to the antenna 332 for transmission. When receiving a low band signal from the antenna 332, the switch 526 connects its input terminal to a second output terminal to receive a low band signal output from the node 544 of the multiplexing LNA 532. This signal then flows to the terminal 558 and thereafter to the cross switch 310.

A switch group 510 includes switch 512 and switch 514. The switch 512 receives, at an input terminal, the mid/high band signal at terminal 504 and selectively connects this input terminal to one of 10 output terminals. The output terminals of the switch 512 are connected to signal paths that include filters, shown generally at 518. The filters operate to filter the MHB input signal at terminal 504 to pass selected bands to the multiplexing LNA 532. For example, the filters 518 filter the mid/high band input signal to pass mid bands B1, B3, B4, B25, B34 and B39 to the multiplexing LNA 532. The filters 518 also filter the mid/high band input signal to pass high bands B7, B30, B40A, and B41b/B38 to the multiplexing LNA 532.

During a transmission mode, a first terminal of a switch 548 is connected to a first terminal of the switch 512 to pass a mid/high band Tx bypass signal that can be selectively connected to a terminal of the switch 512 to pass the mid/high Tx bypass signal to the antenna 332. A second terminal of the switch 548 is connected to a first switch section of the switches 568 to pass a mid band Tx bypass signal, which flows through the filters 566 and into a fourth terminal of the switch 512. A fifth terminal of the switch 548 is connected to a second switch portion of the switches 568 to pass a high band Tx signal, which flows through the filters 566 and into the fourth terminal of the switch 512. A seventh terminal of the switch 548 is connected to a second terminal of switch 514 to pass an ultra high band Tx bypass signal to the switch 514.

The switch 514 communicates the ultra high band signal 508 between the module 114 and the secondary antenna 336. When receiving the ultra high band signal at terminal 508 from the secondary antenna 336, the switch 514 connects its input terminal to a first output terminal to pass the ultra high band signal to a filter that filters this signal to output an ultra high band "B42" that is input to the multiplexing LNA 532. When transmitting the ultra high band signal, the switch 514 connects its input terminal to a second output terminal to receive an ultra high band transmit signal that is passed to the secondary antenna 336. A MIPI 516 controls the operation of the switches 512, 570, and 514 of the switch group 510, and the operation of the switches 568.

The switch 570 has an input terminal connected to receive a mid/low band signal at terminal 506. The switch 570 has first and second terminals that can be selectively connected to the input terminal to pass the mid/low band signal to filters 518 that filter this signal to output mid band signal bands (B11+B21) and B32 to the multiplexing LNA 532.

The multiplexing LNA 532 includes amplifiers (D1-D17). Selected amplifiers of the multiplexing LNA 532 have their outputs connected together to generate a signal comprising a selected band. For example, the outputs of a first group of amplifiers (D1-D4, D7-D11 and D13) have their outputs connected together to provide a signal comprising a selected low/mid band output (LMBO) signal at node 546. A second group of amplifiers (D1-D2) have their outputs connected together to provide a selected low band (LBO) signal at node 544. A third group of amplifiers (D3-D8) have their outputs connected together to provide a selected first mid/high band (MHBO1) signal at node 542. A fourth group of amplifiers (D3-D13) have their outputs connected together to provide a selected second mid/high band (MHBO2) signal at node 540. A fifth group of amplifiers (D5, D6, D12, D14, D15, and D17) have their outputs connected together to provide a selected first high/ultra high band (HUHBO1) signal at node 538. A sixth group of amplifiers (D5, D6, D12, D14, D15, and D17) have their outputs connected together to provide a selected second high/ultra high band (HUHBO2) signal at node 536.

Enabling and disabling the amplifiers (D1-D17) controls which of the input band signals are amplified and passed to the output nodes. In an exemplary embodiment, MIPI 534 operates to enable and disable the amplifiers (D1-D17) to control the operation of the multiplexing LNA 532 to output selected signal bands. Accordingly, the diversity antenna module 114 receives diversity signals obtained from one or more of the secondary antennas (332, 336) and filters these signals to pass selected bands, which are amplified and output to the cross switch 310 (e.g., LB-out-CS), the cross switch 320, or directly to the DRx 326 for input to the transceiver 304.

Figure 6:
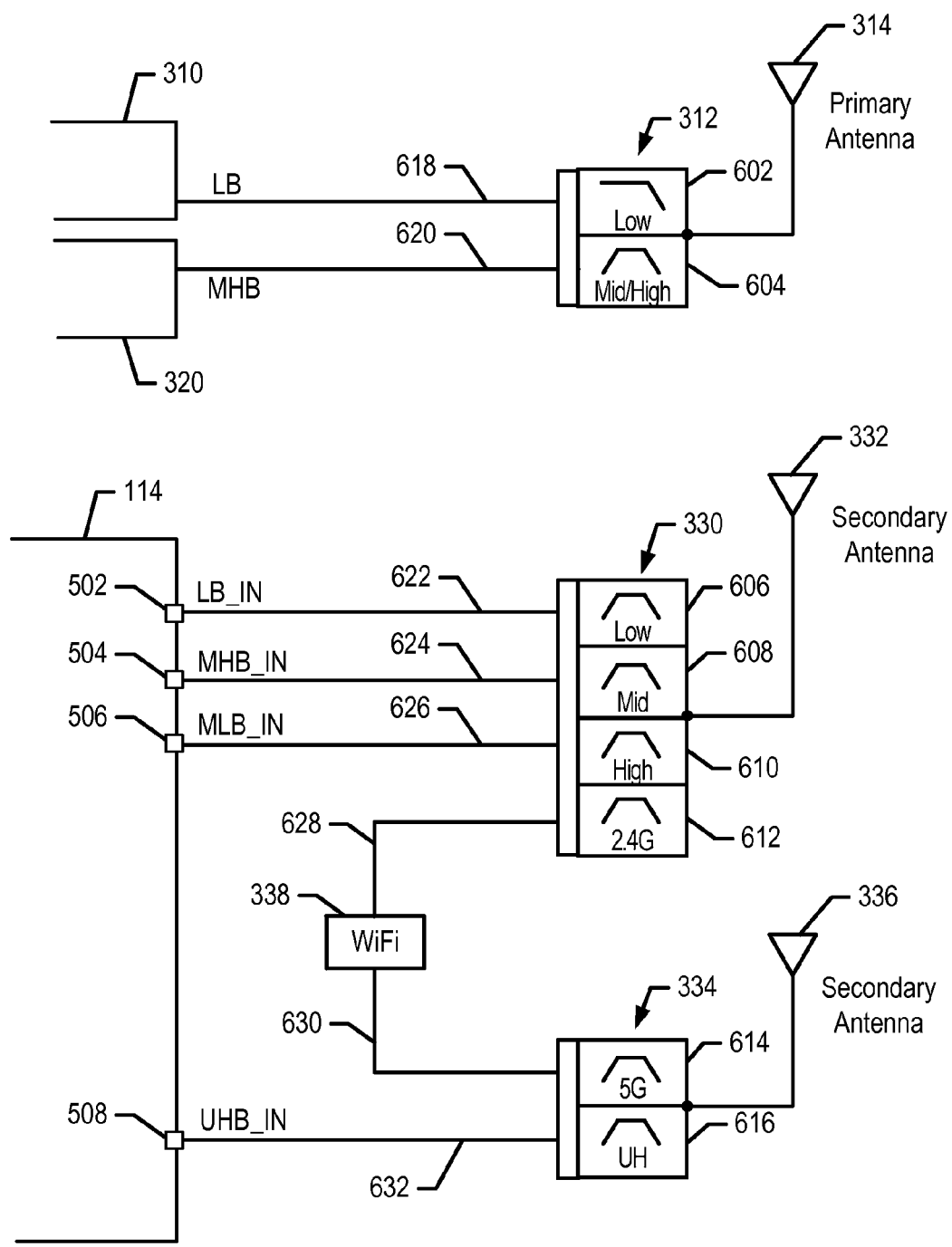
FIG. 6 shows antenna configurations for use with the front end shown in FIG. 3.

FIG. 6 shows antenna configurations for use with the front end 300 shown in FIG. 3 and more specifically with the diversity module 114 shown in FIG. 5. The primary antenna 314 communicates receive and transmit signals with the filter 312. The filter 312 includes a first stage 602 that filters low band transmit and receive signals. For example, the first stage 602 communicates low band signals between the antenna 314 and the cross switch 310 using the signal path 618. The filter 312 includes a second stage 604 that filters mid and high band transmit and receive signals. For example, the second stage 604 communicates mid and high band signals between the antenna 314 and the cross switch 320 using the signal path.

The secondary antenna 332 communicates receive and transmit signals with the filter 330. The filter 330 includes a first stage 606 that filters low band transmit and receive signals. For example, the first stage 606 communicates low band signals between the antenna 332 and the diversity antenna module 114 using the signal path 622 that connects to the terminal 502. The filter 330 includes a second stage 608 that filters mid band transmit and receive signals. For example, the second stage 608 communicates mid band signals between the antenna 332 and the diversity antenna module 114 using signal path 624 that connects to the terminal 504. The filter 330 includes a third stage 610 that filters high band transmit and receive signals. For example, the third stage 610 communicates high band signals between the antenna 332 and the diversity antenna module 114 using signal path 626 that connects to the terminal 506. The filter 330 includes a fourth stage 612 that filters WiFi transmit and receive signals. For example, the fourth stage 612 communicates 2.4 GHz WiFi signals between the antenna 332 and the WiFi modem 338 using signal path 628.

The secondary antenna 336 communicates receive and transmit signals with the filter 334. The filter 334 includes a first stage 614 that filters WiFi transmit and receive signals. For example, the first stage 614 communicates 5 GHz WiFi signals between the antenna 336 and the WiFi modem 338 using the signal path 630. The filter 334 includes a second stage 616 that filters ultra high band transmit and receive signals. For example, the second stage 616 communicates ultra high band signals between the antenna 336 and the diversity antenna module 114 using the signal path 632 that connects to the terminal 508.

Figure 7:
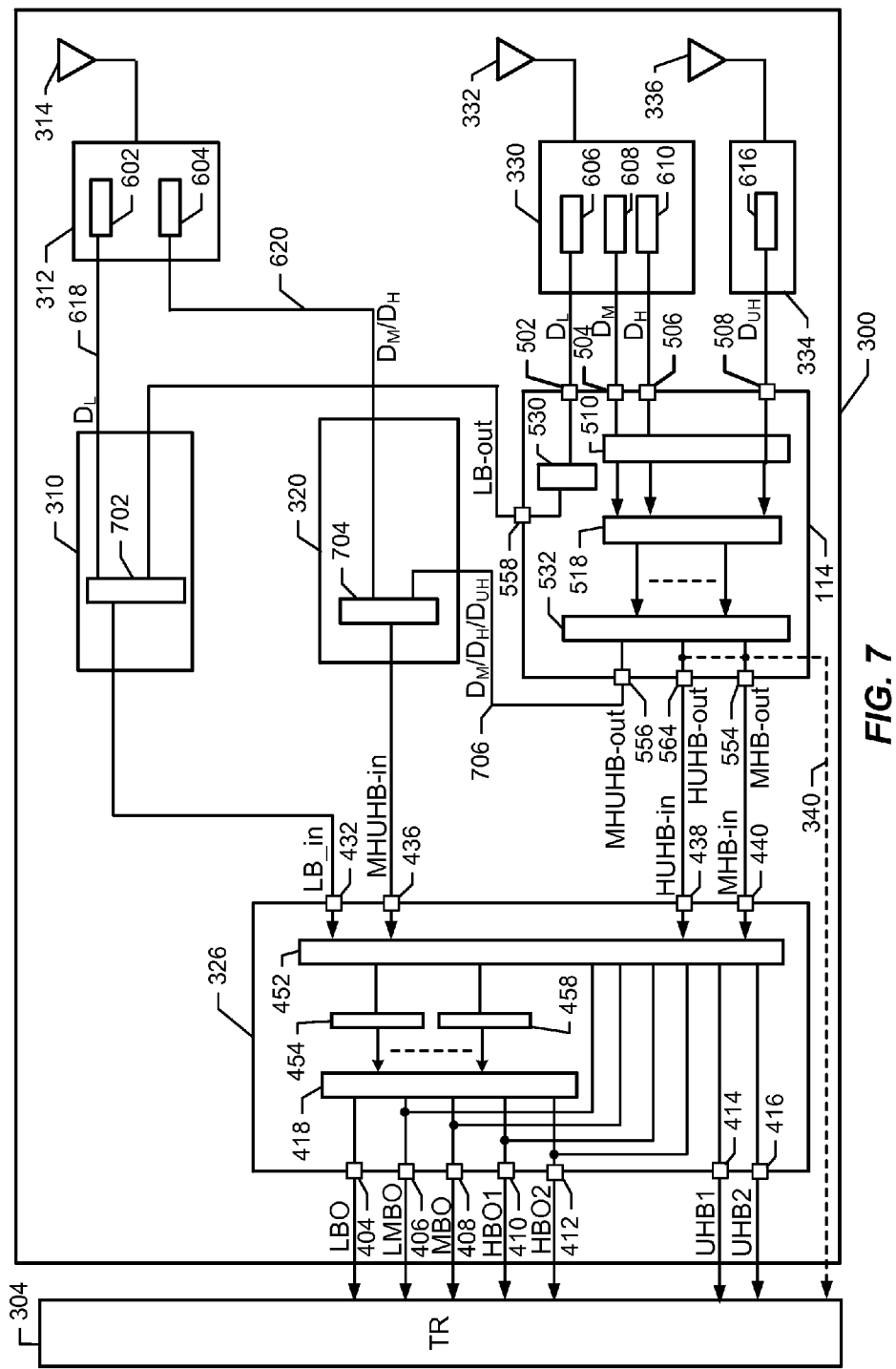
FIG. 7 shows a diagram that illustrates diversity receive signal paths of the front end.

FIG. 7 shows a diagram that illustrates diversity receive signal paths of the front end 300. In an exemplary embodiment, the diversity antenna module 114 processes secondary antenna signals to output mid, high and ultra high band diversity signals that are input directly to the transceiver 304. For example, the mid, high, and ultra high signals flow to the transceiver 304 through closed switches of the switch group 452 of the DRx 326.

Low band signals received by the primary antenna 314 flow along path 618 to a band selector 702 of the cross switch 310. Low band signals received by the secondary antenna 332 flow through the low band circuit 530 and are output (LB-out) to the band selector 702 that outputs selected low bands (LB-in) that are received at terminal 432 of the DRx 326. The band selector 702 of the cross switch 310 selects from the low bands it receives and outputs low band diversity signals (LB-in) to the DRx 326.

Mid and high band signals received by the primary antenna 314 flow along path 620 to a band selector 704 of the cross switch 320. Mid, high and ultra high band signals received by the secondary antennas 332 and 336 flow through the multiplexing LNA 532 along path 706 to the band selector 704 of the cross switch 320. The band selector 704 outputs selected mid, high, and ultra high band diversity signals (MHUHB-in) that are received at terminal 436 of the DRx 326.

The diversity receiver 326 includes the switch group 452, band selection filters 454 and 458 and the multiplexing LNA 418. The switch group 452 outputs selected received signals to the band selection filters 454 and 458 that filter the signals to select bands for input to the multiplexing LNA 418. The multiplexing LNA 418 combines and amplifies the signal bands to generate the signals LBO, LMBO, MBO, HBO1, and HBO2 signals that are input the transceiver 304.

Mid and high band signals received by the secondary antenna 332 flow to the switch group 510 of the diversity antenna module 114. Ultra-high band signals received by the secondary antenna 336 also flow to the switch group 510 of the diversity antenna module 114. The switch group 510 outputs selected mid, high, and ultra-high band signals to the filters 518, which filter selected bands from the received signals and inputs these bands into the multiplexing LNA 532. The multiplexing LNA 532 combines selected signal bands it receives and outputs the mid/high/ultra high band signals (MHUHB-out) at terminal 556 along path 706 ($D_M/D_H/D_{UH}$) to the cross switch 320. The selector 704 of the cross switch 320 outputs selected mid/high/ultra high bands from the signals it receives and outputs the MHUHB-in signal to the DRx 326, which is received at the terminal 436.

The multiplexing LNA 532 also outputs a high/ultra high band diversity signal (HUHB-out) at terminal 564, and a mid/high band diversity signals (MHB-out) at terminal 554. These signals are received by the DRx 326 at terminals 438 and 440, respectively. These signals are input to the switch group 452 of the DRx 326, which selects one or more of these signals to be input directly into the transceiver 304. Thus, these signals are input to the transceiver 304 without any additional filtering, such as that provided by the selection filters 454 and 458.

In an exemplary embodiment, the diversity antenna module 114 provides greater flexibility and the ability to process a greater number of diversity signal combinations when compared to conventional systems. For example, in an exemplary embodiment, the diversity antenna module 114 is configured to provide a transmit signal path to transmit a high band TDD signal using the diversity antennas 332. For example, a HB Tx signals flows through the switch 556 and onto the HB TX Bypass signal path to the switch 568, which is configured to enable the high band Tx signal to flow to the duplexer 566. The duplexer 566 is connected to the fourth terminal of the switch 512, which is configured by the MIPI 516 to be connected to the input/output terminal of the switch 504, thereby inputting the high band Tx signal to the filter 330 for transmission by the secondary antenna 332.

Simultaneously with the transmission of the high band signal, the secondary antenna 332 receives FDD mid band and low band signals that are input to the diversity antenna module 114. For example, low band signals are input to the terminal 502 and mid band signals are input to the terminals 504 and 506. The received low band diversity signals are routed from terminal 502 through module 530, such that selected low band signals are output from terminal 558. The mid band diversity signals received at terminal 504 are routed back through the duplexer 566 and input to the band selection filters 518. For example, the output of the duplexer 566 is input to the switch 568, which is configured to output the received diversity signals to selected band selection filters. The mid band diversity signals received at terminal 506 are input to the switch 570, which is configured to pass the received diversity signals to the band selection filters 518.

The band selection filters 518 filter the receive diversity signals to generate mid band signals that are input to the multiplexing LNA 532. For example, the mid band signals may include signal bands (B1, B3, B4, B25, B11+B21, and B32). The multiplexing LNA 532 amplifies selected mid band signals by enabling selected ones of the amplifiers (D1-D17) and outputs amplified mid band signals at port 540 that is connected to terminal 554. The terminal 554 is connected to input ports 440 of the DRx 326. The amplified mid band signals received at input ports 440 of the DRx 326 are routed by the switch 446 to the transceiver 304. Also, the low band diversity signals are received by the DRx 326 at terminal 432 and routed to the transceiver 304. Thus, in this example, the diversity antenna module 114 is configured to establish a transmit signal path to transmit one high band TDD signal. The diversity antenna module 114 is also configured to receive three downlink FDD diversity signals (e.g., one low band and two mid band signals). The three downlink diversity signals are input to the transceiver 304 using the switching functions of the DRx 326. It should be noted that the DRx 326 provides no additional filtering of the mid band signals it receives and therefore these signals are input to the transceiver 304 as received from the diversity antenna module 114 without additional filtering. It should also be noted that in an exemplary embodiment, the mid band signals output from the diversity antenna module 114 can be input directly to the transceiver 304 using the optional signal path 340 shown in FIG. 3 and in FIG. 7.

In another exemplary embodiment, the diversity antenna module 114 is configured to provide a transmit signal path to transmit a mid band FDD signal using the diversity antennas 332. For example, a mid band Tx signal flows through the switch 556 and onto the MB TX Bypass signal path to the switch 568, which is configured to enable the mid band Tx signal to flow to the duplexer 566. The duplexer 566 is connected to the fourth terminal of the switch 512, which is configured by the MIPI 516 to be connected to the input/output terminal of the switch 504, thereby inputting the mid band Tx signal to the filter 330 for transmission by the secondary antenna 332.

Simultaneously with the transmission of the FDD mid band signal, the secondary antenna 332 receives two TDD high band signals and FDD low and mid band signals that are input to the diversity antenna module 114. For example, low band signals are input to the terminal 502 and the high and mid band signals are input to the terminals 504 and 506. The received low band diversity signals are routed from terminal 502 through module 530, such that selected low band signals are output from terminal 558. The mid and high band diversity signals received at terminal 504 are routed back through the duplexer 566 and input to the band selection filters 518. For example, the output of the duplexer 566 is input to the switch 568, which is configured to output the received diversity signals to selected band selection filters. The mid band diversity signals received at terminal 506 are input to the switch 570, which is configured to pass the received diversity signals to the band selection filters 518.

The band selection filters 518 filter the receive diversity signals to generate high mid band signals that are input to the multiplexing LNA 532. For example, the mid band signals may include signal bands (B1, B3, B4, B25, B11+B21, and B32) and the high band signals may include (B7, B30). The multiplexing LNA 532 amplifies selected high and mid band signals by enabling selected ones of the amplifiers (D1-D17) and outputs amplified high and mid band signals at ports 540 and port 538 that are connected to terminals 554 and 564. The terminal 554 is connected to input ports 440 of the DRx 326 and the terminal 564 is connected to terminal 438 of the DRx 326. The amplified mid band signals received at input ports 440 of the DRx 326 are routed by the switch 446 to the transceiver 304. The amplified high band signals received at input port 438 also are routed by switch 446 to the transceiver 304. In addition, the low band diversity signals are received by the DRx 326 at terminal 432 and routed to the transceiver 304. Thus, in this example, the diversity antenna module 114 is configured to establish a transmit signal path to transmit one mid band FDD signal. The diversity antenna module 114 is also configured to receive four downlink FDD diversity signals (e.g., one low band, two high band (intra CA), and one mid band signal). The four downlink diversity signals are input to the transceiver 304 using the switching functions of the DRx 326. It should be noted that the DRx 326 provides no additional filtering of the high and mid band signals it receives and therefore these signals are input to the transceiver 304 as received from the diversity antenna module 114 without additional filtering. It should also be noted that in an exemplary embodiment, the high and mid band signals output from the diversity antenna module 114 can be input directly to the transceiver 304 using the optional signal path 340 shown in FIG. 3 and in FIG. 7.

Therefore, low band diversity signals received by the diversity antenna 332 can be input to the DRx 326 at terminal 432 and selectively input to the transceiver 304. In addition to receiving the low band diversity signals, the diversity antenna module 114 simultaneously receives mid, high, and ultra high band diversity signals from the antennas 332 and 336. The multiplexing LNA 532 of the diversity antenna module 114 then outputs (at terminal 556) selected mid, high, and ultra high band signal to the cross switch 320 and outputs (at terminals 564, 554) selected mid, high, and ultra high signal bands to the DRx 326. The DRx 326 can select from the signal bands received at the terminals 432, 436, 438, and 440 to determine the low, mid, high, and ultra high band diversity signals to input to the transceiver 304.

Additionally, in an exemplary embodiment, mid, high, and ultra high signal bands output from the multiplexing LNA 532 are input directly to the DRx 326 and received at the switch group 452. The switch group 452 selects from these received signals to determine which will be input directly to the transceiver 304 without additional filtering. Thus, it is possible that the transceiver 304 simultaneously receives up to four diversity signals. For example, the transceiver 304 can receive a low band diversity signal from the primary antenna 314 and three additional diversity signals from the secondary antennas 332 and 336. For example, the three additional diversity signals can be selected from the mid, high and ultra high bands. Thus, the band group combinations of diversity signals that can be simultaneously received by the transceiver 304 include (L/M/M/H, L/M/H/H, L/M/H/UH, L/L/M/H, L/L/M/UH, M/M/H/H, and M/M/UH/UH). It should also be noted that other band group combinations are possible and can be determined from the switch selections of the various modules and switches illustrated in the drawings.

Accordingly, the diversity antenna module 114 processes diversity signals received from the secondary antennas (332 and 336) and provides selected diversity signals directly to the diversity receiver 326 and/or to the cross switches 310, 320. The diversity signals provided to the DRx 326 are input directly to the transceiver 304 without additional amplification and/or filtering. In an exemplary embodiment, the signals flow through closed switches of the switch group 452 but additional filtering is avoided. In an exemplary embodiment, the optional signal path 340 can be used to input diversity signals directly to the transceiver 304. The various embodiments provide greater flexible and diversity signal reception combinations while reducing parts, space and costs over conventional front ends.

Figure 8:
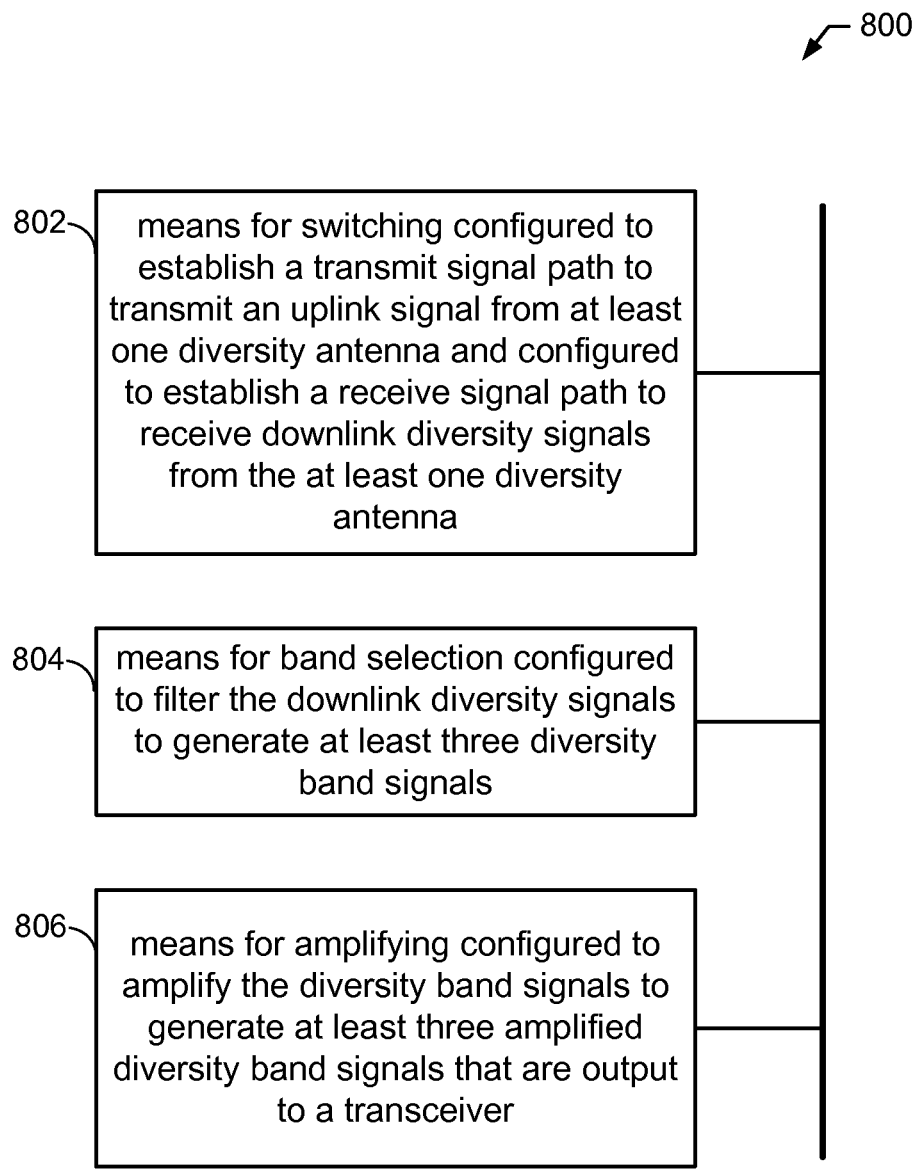
FIG. 8 shows an exemplary embodiment of diversity receiver apparatus.

FIG. 8 shows an exemplary embodiment of diversity receiver apparatus 800. In an exemplary embodiment, the apparatus 800 is suitable for use as the diversity receiver module 114 shown in FIG. 5.

The apparatus 800 includes a first means (802) for switching configured to establish a transmit signal path to transmit an uplink signal from at least one diversity antenna and configured to establish a receive signal path to receive downlink diversity signals from the at least one diversity antenna, which in an exemplary embodiment comprises the switch group 510. The apparatus 800 also comprises a second means (804) for band selection configured to filter the downlink diversity signals to generate at least three diversity band signals, which in an exemplary embodiment comprises the filters 518. The apparatus 800 also comprises a third means (806) for amplifying configured to amplify the diversity band signals to generate at least three amplified diversity band signals that are output to a transceiver, which in an exemplary embodiment comprises the multiplexing LNA 532.

The exemplary embodiments described herein may be implemented on an IC, an analog IC, an RFIC, a mixed-signal IC, an ASIC, a printed circuit board (PCB), an electronic device, etc. The exemplary embodiments may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing an exemplary embodiment described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but the disclose is to be accorded the widest scope consistent with the principles and novel features disclosed herein.

What is claimed is:

1. An apparatus comprising:
at least one switch configured to establish a transmit signal path to transmit an uplink signal from at least one diversity antenna and to establish a receive signal path to receive downlink diversity signals from the at least one diversity antenna;
band selection filters configured to filter the downlink diversity signals to generate at least three diversity band signals;
a multiplexing amplifier coupled via at least one of the band selection filters to the at least one switch and configured to amplify the at least three diversity band signals to generate at least three amplified diversity band signals that are output to a transceiver, wherein the multiplexing amplifier includes a first plurality of inputs and a second plurality of inputs, wherein the multiplexing amplifier includes a first plurality of amplifiers including a first group of amplifiers coupled to a first output, a second group of amplifiers coupled to a second output, and a third group of amplifiers coupled to a third output, wherein the second group includes at least one amplifier of the first group, wherein the third group includes at least one amplifier of the second group, and wherein the multiplexing amplifier is further configured to generate a first amplified diversity band signal of the at least three amplified diversity band signals at the first output based on at least one signal received at the first plurality of inputs; and
a second multiplexing amplifier having at least one output coupled via one or more switches to at least one input of the multiplexing amplifier.

2. The apparatus of claim 1, wherein the first plurality of inputs correspond to a first band of at least three diversity bands, and wherein the second plurality of inputs correspond to a second band of the at least three diversity bands that is different than the first band.

3. The apparatus of claim 1, wherein the transmit signal path is configured to transmit an uplink time division duplex (TDD) signal, wherein the band selection filters are configured to filter the downlink diversity signals to generate at least three downlink frequency division duplex (FDD) diversity band signals, wherein the uplink TDD signal resides in a high band group, and wherein the at least three downlink FDD diversity band signals reside in at least one of low and mid band groups.

4. The apparatus of claim 3, wherein the multiplexing amplifier is configured to amplify the at least three downlink FDD diversity band signals to generate amplified versions of the at least three downlink FDD diversity band signals, and wherein the amplified versions of the at least three downlink FDD diversity band signals that are in the mid band group are output to the transceiver.

5. The apparatus of claim 1, wherein the multiplexing amplifier includes a third plurality of inputs, wherein the multiplexing amplifier is further configured to generate a second amplified diversity band signal of the at least three amplified diversity band signals at the second output based on at least a second signal received at the second plurality of inputs, and wherein the second amplified diversity band signal is different than the first amplified diversity band signal.

6. The apparatus of claim 5, wherein the at least one switch includes a first switch configured to receive a low frequency diversity band signal as an input and to output the low frequency diversity band signal to a plurality of low frequency diversity band signal paths, and wherein the at least one switch includes a second switch configured to receive a medium frequency diversity band signal as an input and to output the medium frequency diversity band signal to a plurality of medium frequency diversity band signal paths.

7. The apparatus of claim 1, wherein the transmit signal path is configured to transmit an uplink frequency division duplex (FDD) signal, wherein the band selection filters are configured to filter the received diversity signals to generate at least four downlink diversity band signals, wherein the uplink FDD signal resides in a mid band group, wherein first and second downlink diversity band signals comprise time division duplex (TDD) signals that reside in a high band group, and wherein third and fourth downlink diversity band signals comprise FDD signals that reside in the mid band group.

8. The apparatus of claim 7, wherein the multiplexing amplifier is configured to amplify the at least four downlink diversity band signals to generate amplified versions of the at least four downlink diversity band signals and to output the amplified versions of the at least four downlink diversity band signals to the transceiver, and wherein each of the at least four downlink diversity band signals resides in the high band group or the mid band group.

9. The apparatus of claim 1, wherein the first plurality of amplifiers is configured to receive the at least three diversity band signals and selectively amplify the at least three diversity band signals to generate the at least three amplified diversity band signals.

10. The apparatus of claim 1, wherein the apparatus is configured in a front end of a wireless device to route the at least three amplified diversity band signals to the transceiver.

11. The apparatus of claim 1, wherein the at least one diversity antenna comprises a first diversity antenna and a second diversity antenna, the first diversity antenna coupled to the multiplexing amplifier, and the second diversity antenna coupled to the multiplexing amplifier.

12. The apparatus of claim 1, wherein the first output is associated with a first frequency band, wherein the multiplexing amplifier is further configured to generate a second amplified diversity band signal of the at least three amplified diversity band signals at the second output, and wherein the second output is associated with the first frequency band and a second frequency band.

13. The apparatus of claim 12, wherein the multiplexing amplifier is further configured to generate a third amplified diversity signal band of the at least three amplified diversity band signals at the third output, and wherein the third output is associated with at least the second frequency band.

14. The apparatus of claim 1, wherein the multiplexing amplifier is further configured to generate a second amplified diversity signal band of the at least three amplified diversity band signals at the second output, wherein the multiplexing amplifier is further configured to generate a third amplified diversity signal band of the at least three amplified diversity band signals at the third output, wherein the first output is coupled to a first input of the transceiver, wherein the second output is coupled to a second input of the transceiver, and wherein the third output is coupled to a third input of the transceiver.

15. The apparatus of claim 1, wherein the second multiplexing amplifier is further coupled to one or more bypass paths via the one or more switches, the one or more bypass paths bypassing the multiplexing amplifier and coupled to one or more inputs of the transceiver.

16. The apparatus of claim 1, further comprising the at least one diversity antenna coupled to at least one input of the second multiplexing amplifier.

17. The apparatus of claim 1, wherein the second multiplexing amplifier has at least two outputs coupled via the one or more switches to at least two inputs of the multiplexing amplifier.

18. The apparatus of claim 1, wherein the first output is configured to output the first amplified diversity band signal having a frequency in a low band, wherein the second output is configured to output a second amplified diversity band signal of the at least three amplified diversity band signals having a frequency in the low band or a mid band, and wherein the third output is configured to output a third amplified diversity band signal of the at least three amplified diversity band signals having a frequency in the mid band.

19. The apparatus of claim 1, wherein the second multiplexing amplifier includes a second plurality of amplifiers including a fourth group of amplifiers coupled to a fourth output of the second multiplexing amplifier, a fifth group of amplifiers coupled to a fifth output of the second multiplexing amplifier, and a sixth group of amplifiers coupled to a sixth output of the second multiplexing amplifier, the fifth group including at least one amplifier of the fourth group, and the sixth group including at least one amplifier of the fourth group.

20. The apparatus of claim 19, wherein the fourth output is configured to output a fourth amplified diversity band signal having a frequency in a mid band or a low band, wherein the fifth output is configured to output a fifth amplified diversity band signal having a frequency in the low band, and wherein the sixth output is configured to output a sixth amplified diversity band signal having a frequency in the mid band or a high band.

21. The apparatus of claim 19, further comprising:
first circuitry configured to selectively enable one or more of the first plurality of amplifiers of the multiplexing amplifier; and
second circuitry configured to selectively enable one or more of the second plurality of amplifiers of the second multiplexing amplifier.

22. The apparatus of claim 1, further comprising second band selection filters coupled to one or more inputs of the second multiplexing amplifier.

23. An apparatus comprising:
means for switching configured to establish a transmit signal path to transmit an uplink signal from at least one diversity antenna and configured to establish a receive signal path to receive downlink diversity signals from the at least one diversity antenna;
means for band selection configured to filter the downlink diversity signals to generate at least three diversity band signals;
means for amplifying coupled via one or more of the means for band selection to the means for switching and configured to amplify the diversity band signals to generate at least three amplified diversity band signals that are output to a transceiver, wherein the means for amplifying includes a first plurality of inputs and a second plurality of inputs, wherein the means for amplifying includes a first plurality of means for amplifying including a first group of means for amplifying coupled to a first output, a second group of means for amplifying coupled to a second output, and a third group of means for amplifying coupled to a third output, wherein the second group includes at least one means for amplifying of the first group, wherein the third group includes at least one means for amplifying of the second group, and wherein the means for amplifying is further configured to generate a first amplified diversity band signal of the at least three amplified diversity band signals at the first output based on at least one signal received at the first plurality of inputs; and
second means for amplifying having at least one output coupled via second means for switching to at least one input of the means for amplifying.

24. The apparatus of claim 23, wherein the means for amplifying is further configured to generate a first amplified diversity band signal by combining a plurality of first diversity band signals and to generate a second amplified diversity band signal by combining a plurality of second diversity band signals.

25. The apparatus of claim 23, wherein the transmit signal path is configured to transmit an uplink time division duplex (TDD) signal from the at least one diversity antenna, wherein the means for band selection is configured to filter the downlink diversity signals to generate at least three downlink frequency division duplex (FDD) diversity band signals that are input to the means for amplifying, wherein the uplink TDD signal resides in a high band group, and wherein the at least three downlink FDD diversity band signals reside in at least one of low and mid band groups.

26. The apparatus of claim 25, wherein the means for amplifying is configured to amplify the at least three downlink FDD diversity band signals to generate amplified versions of the at least three downlink FDD diversity band signals, and wherein the at least three amplified diversity band signals in the mid band group are output to the transceiver.

27. The apparatus of claim 23, wherein the transmit signal path is configured to transmit a mid band uplink FDD signal to the at least one diversity antenna, and wherein the means for band selection is configured to filter the downlink diversity signals to generate first and second downlink diversity band signals comprising TDD signals that reside in a high band and third and fourth downlink diversity band signals comprising FDD signals that reside in at least one of a low band and a mid band.

28. The apparatus of claim 27, wherein the means for amplifying is configured to amplify the four downlink diversity band signals to generate amplified versions of the four downlink diversity band signals, and wherein the amplified versions of the four downlink diversity band signals that are in the high band and the mid band are output to the transceiver.

* * * * *